(12) United States Patent
Miller

(10) Patent No.: US 9,416,294 B2
(45) Date of Patent: Aug. 16, 2016

(54) CURABLE EPOXIDE CONTAINING FORMALDEHYDE-FREE COMPOSITIONS, ARTICLES INCLUDING THE SAME, AND METHODS OF USING THE SAME

(71) Applicant: H.B. FULLER COMPANY, St. Paul, MN (US)

(72) Inventor: Wayne P. Miller, Mounds View, MN (US)

(73) Assignee: H.B. Fuller Company, St. Paul, MN (US)

( * ) Notice: Subject to any disclaimer, the term of this patent is extended or adjusted under 35 U.S.C. 154(b) by 78 days.

(21) Appl. No.: 13/826,730

(22) Filed: Mar. 14, 2013

(65) Prior Publication Data
US 2013/0284668 A1 Oct. 31, 2013

Related U.S. Application Data

(63) Continuation-in-part of application No. 13/460,367, filed on Apr. 30, 2012, now Pat. No. 8,791,198.

(51) Int. Cl.
| | | |
|---|---|---|
| C09D 131/04 | (2006.01) | |
| B01D 39/16 | (2006.01) | |
| C08L 31/04 | (2006.01) | |
| C08L 43/04 | (2006.01) | |
| C08L 63/00 | (2006.01) | |
| D21H 17/38 | (2006.01) | |
| D21H 27/08 | (2006.01) | |
| D21H 17/35 | (2006.01) | |
| D21H 17/36 | (2006.01) | |
| D21H 17/37 | (2006.01) | |
| D21H 17/52 | (2006.01) | |
| D21H 17/57 | (2006.01) | |
| D21H 19/20 | (2006.01) | |
| D21H 19/56 | (2006.01) | |

(52) U.S. Cl.
CPC .......... *C09D 131/04* (2013.01); *B01D 39/1623* (2013.01); *C08L 31/04* (2013.01); *C08L 43/04* (2013.01); *C08L 63/00* (2013.01); *D21H 17/35* (2013.01); *D21H 17/36* (2013.01); *D21H 17/37* (2013.01); *D21H 17/38* (2013.01); *D21H 17/52* (2013.01); *D21H 17/57* (2013.01); *D21H 19/20* (2013.01); *D21H 19/56* (2013.01); *D21H 27/08* (2013.01); *B01D 2239/0464* (2013.01)

(58) Field of Classification Search
CPC .. C09D 131/04; B01D 39/1623; C08L 31/04; C08L 63/00
USPC ..................... 55/524; 210/508; 523/402, 437; 525/221
See application file for complete search history.

(56) References Cited

U.S. PATENT DOCUMENTS

| | | | |
|---|---|---|---|
| 2,671,065 A * | 3/1954 | Ulrich ........................... 524/460 |
| 2,789,099 A | 4/1957 | Howard et al. | |
| 3,116,270 A | 12/1963 | Pennino | |
| 3,142,688 A * | 7/1964 | Lastovica, Jr. ................ 549/541 |
| 3,387,061 A | 6/1968 | Smith et al. | |
| 3,669,942 A | 6/1972 | Van Westrenen et al. | |
| 3,755,282 A | 8/1973 | Wright | |
| 3,806,483 A * | 4/1974 | Juba .............................. 523/412 |
| 3,945,964 A * | 3/1976 | Hastings et al. .............. 523/406 |
| 3,950,398 A | 4/1976 | Klein | |
| 4,077,926 A | 3/1978 | Sanderson et al. | |
| 4,079,025 A | 3/1978 | Young et al. | |
| 4,108,819 A * | 8/1978 | Oyamada et al. ............. 523/402 |
| 4,157,994 A | 6/1979 | Meier et al. | |
| 4,267,246 A * | 5/1981 | Nishibayashi et al. .... 430/123.5 |
| 4,331,438 A | 5/1982 | Pai | |
| 4,375,535 A | 3/1983 | Kightlinger et al. | |
| 4,377,433 A * | 3/1983 | Merz et al. .................... 156/326 |
| 4,396,680 A | 8/1983 | Chang | |
| 4,431,689 A * | 2/1984 | Gunter ....................... 427/388.2 |
| 4,435,556 A | 3/1984 | Masler, III | |
| 4,534,866 A | 8/1985 | Becker | |
| 4,621,127 A | 11/1986 | Denzinger et al. | |
| 4,743,664 A | 5/1988 | Matui et al. | |
| 4,845,152 A | 7/1989 | Palmer | |
| 4,861,539 A | 8/1989 | Allen et al. | |
| 4,936,865 A | 6/1990 | Welch et al. | |
| 4,980,433 A | 12/1990 | Chen et al. | |
| 4,992,519 A | 2/1991 | Mukherjee | |
| 5,008,308 A * | 4/1991 | Takahashi et al. ............ 523/406 |
| 5,026,746 A | 6/1991 | Floyd et al. | |
| 5,028,655 A | 7/1991 | Stack | |
| 5,073,612 A | 12/1991 | Irie et al. | |

(Continued)

FOREIGN PATENT DOCUMENTS

DE 19949591 4/2001
EP 255870 A2 * 2/1988

(Continued)

OTHER PUBLICATIONS

Poly(vinyl acetate), Polymers: A Properties Database, www.polymersdatabase.com, downloaded on Jul. 23, 2014.*
Epikote Resin 1004, product data sheet, 2006, 2 pages.*
Stoye, D., "Solvents," Ullmann's Encyclopedia of Industrial Chemistry, vol. 33, pp. 619-688, published online 2000.*
Robert D. Athey Jr., Emulsion Polymer Technology, 1991, p. 195, Marcel Dekker Inc. New York.
Compton, R. A, et al., "Ester formation and hydrolysis and related reactions," Comprehensive Chemical Kinetics, 1972,Elsevier, p. 155.
Stepan-Mild BSB, Product Bulletin, 2013.
Sodium 2-{2-[2-(tridecyloxy)ethoxy]ethoxy}ethyl sulfate, compound summary showing structure of sodium trideceth sulfate, downloaded from PureChem on Apr. 8, 2013.
Guo, X, Q., at al.: "Studies on the kinetic and initiation mechanism of acrylamide polymerization using persulfate/aliphatic diamine systems as initiator," Makromol. Chem., 19.

(Continued)

*Primary Examiner* — Mark Eashoo
*Assistant Examiner* — Nicholas Hill
(74) *Attorney, Agent, or Firm* — Kirsten Stone; Allison Johnson

(57) ABSTRACT

A composition is disclosed that includes a water insoluble polymer, a polycarboxy functional polymer, and a water insoluble epoxide functional compound, the water insoluble polymer including at least one of polyvinyl acetate, vinyl acetate copolymer, styrene copolymer, acrylate copolymer, and polyurethane.

34 Claims, No Drawings

(56) References Cited

U.S. PATENT DOCUMENTS

| | | |
|---|---|---|
| 5,077,361 A | 12/1991 | Hughes et al. |
| 5,116,890 A | 5/1992 | Floyd et al. |
| 5,137,963 A | 8/1992 | Stack |
| 5,143,582 A | 9/1992 | Arkens et al. |
| 5,147,956 A | 9/1992 | Allen |
| 5,179,173 A | 1/1993 | Fong et al. |
| 5,185,413 A | 2/1993 | Yoshinaga et al. |
| 5,190,996 A | 3/1993 | Foran et al. |
| 5,216,099 A | 6/1993 | Hughes et al. |
| 5,219,969 A | 6/1993 | Uhl et al. |
| 5,256,746 A | 10/1993 | Blankenship et al. |
| 5,280,079 A | 1/1994 | Allen et al. |
| 5,294,686 A | 3/1994 | Fiarman et al. |
| 5,314,943 A | 5/1994 | Steinwand |
| 5,318,990 A | 6/1994 | Strauss |
| 5,340,868 A | 8/1994 | Strauss et al. |
| 5,354,803 A | 10/1994 | Dragner et al. |
| 5,376,731 A | 12/1994 | Kerr et al. |
| 5,409,571 A | 4/1995 | Togo et al. |
| 5,410,004 A | 4/1995 | Williams |
| 5,412,026 A | 5/1995 | Holy et al. |
| 5,427,587 A | 6/1995 | Arkens et al. |
| 5,498,658 A | 3/1996 | Pourhmady et al. |
| 5,520,997 A | 5/1996 | Pourhmady et al. |
| 5,536,766 A | 7/1996 | Seyffer et al. |
| 5,549,852 A | 8/1996 | Bell |
| 5,578,371 A | 11/1996 | Taylor et al. |
| 5,604,291 A | 2/1997 | Kerr et al. |
| 5,661,213 A | 8/1997 | Arkens et al. |
| 5,667,848 A | 9/1997 | Wuestefeld et al. |
| 5,670,585 A | 9/1997 | Taylor et al. |
| 5,691,426 A | 11/1997 | Floyd |
| 5,691,432 A | 11/1997 | Williams |
| 5,693,707 A | 12/1997 | Cheng et al. |
| 5,705,475 A | 1/1998 | Tang et al. |
| 5,718,728 A | 2/1998 | Arkens et al. |
| 5,728,771 A | 3/1998 | Tang et al. |
| 5,753,746 A | 5/1998 | Rupaner et al. |
| 5,763,524 A | 6/1998 | Arkens et al. |
| 5,840,822 A | 11/1998 | Lee et al. |
| 5,858,549 A | 1/1999 | Kielbania, Jr. et al. |
| 5,866,664 A | 2/1999 | McCallum, III et al. |
| 5,891,972 A | 4/1999 | Egraz et al. |
| 5,919,716 A | 7/1999 | Raynolds et al. |
| 5,932,665 A | 8/1999 | DePorter et al. |
| 5,977,232 A | 11/1999 | Arkens et al. |
| 5,993,530 A | 11/1999 | Tanaka et al. |
| 6,051,646 A | 4/2000 | Nass et al. |
| 6,063,498 A | 5/2000 | Licht et al. |
| 6,063,884 A | 5/2000 | Egraz et al. |
| 6,071,434 A | 6/2000 | Davis et al. |
| 6,071,994 A | 6/2000 | Hummerich et al. |
| 6,099,773 A | 8/2000 | Reck et al. |
| 6,103,789 A | 8/2000 | Marciandi et al. |
| 6,114,464 A | 9/2000 | Reck et al. |
| 6,136,916 A | 10/2000 | Arkens et al. |
| 6,146,746 A | 11/2000 | Reck et al. |
| 6,171,654 B1 | 1/2001 | Salsman et al. |
| 6,184,321 B1 | 2/2001 | Egraz et al. |
| 6,194,512 B1 | 2/2001 | Chen et al. |
| 6,221,973 B1 | 4/2001 | Arkens et al. |
| 6,241,780 B1 | 6/2001 | Arkens et al. |
| 6,262,159 B1 | 7/2001 | Dreher et al. |
| 6,274,661 B1 | 8/2001 | Chen et al. |
| 6,296,795 B1 | 10/2001 | Buck |
| 6,297,336 B1 | 10/2001 | Shioji et al. |
| 6,299,936 B1 | 10/2001 | Reck et al. |
| 6,309,565 B1 | 10/2001 | Stowell et al. |
| 6,331,350 B1 | 12/2001 | Taylor et al. |
| 6,335,406 B1 | 1/2002 | Nagasuna et al. |
| 6,348,530 B1 | 2/2002 | Reck et al. |
| 6,380,353 B1 | 4/2002 | Rupaner et al. |
| 6,395,813 B1 | 5/2002 | Duccini et al. |
| 6,399,694 B1 | 6/2002 | McGrath et al. |
| 6,410,647 B1 | 6/2002 | Yoshioka et al. |
| 6,444,750 B1 | 9/2002 | Touhsaent |
| 6,472,478 B1 | 10/2002 | Funk et al. |
| 6,489,287 B1 | 12/2002 | Gauthier et al. |
| 6,582,476 B1 | 6/2003 | Binder et al. |
| 6,585,780 B2 | 7/2003 | Koola et al. |
| 6,585,933 B1 | 7/2003 | Ehrhardt et al. |
| 6,596,386 B1 | 7/2003 | Reck et al. |
| 6,599,997 B2 | 7/2003 | Araki et al. |
| 6,699,945 B1 | 3/2004 | Chen et al. |
| 6,730,729 B2 | 5/2004 | Gerst et al. |
| 6,753,361 B2 | 6/2004 | Kroner et al. |
| 6,780,903 B2 | 8/2004 | Peltonen et al. |
| 6,835,767 B2 | 12/2004 | Kuhl et al. |
| 6,884,849 B2 | 4/2005 | Chen et al. |
| 6,906,132 B2 | 6/2005 | Belmares et al. |
| 6,984,675 B2 | 1/2006 | Lesley et al. |
| 7,141,626 B2 | 11/2006 | Rodrigues et al. |
| 7,199,179 B2 | 4/2007 | Clamen et al. |
| 7,384,881 B2 | 6/2008 | Miller et al. |
| 7,413,801 B2 | 8/2008 | Miller et al. |
| 7,854,980 B2 | 12/2010 | Jackson et al. |
| 7,863,373 B1 | 1/2011 | Miller et al. |
| 2002/0091185 A1 | 7/2002 | Taylor et al. |
| 2002/0130439 A1 | 9/2002 | Kroner et al. |
| 2004/0033747 A1 | 2/2004 | Miller et al. |
| 2004/0082240 A1 | 4/2004 | Rodrigues et al. |
| 2004/0082726 A1 | 4/2004 | Rodrigues et al. |
| 2004/0115429 A1 | 6/2004 | Michl et al. |
| 2006/0121810 A1 | 6/2006 | Rodrigues |
| 2006/0160974 A1 | 7/2006 | Schulte et al. |
| 2006/0205852 A1 | 9/2006 | Tang et al. |
| 2006/0264539 A1 | 11/2006 | Mosseveld et al. |
| 2007/0049663 A1 | 3/2007 | Cordova |
| 2007/0220852 A1* | 9/2007 | Lifshutz et al. ................. 55/486 |
| 2007/0292683 A1* | 12/2007 | Pantke et al. ................. 428/339 |
| 2008/0083522 A1 | 4/2008 | Poggi et al. |
| 2008/0152817 A1 | 6/2008 | Kelly |
| 2009/0092832 A1* | 4/2009 | Moireau ........................ 428/378 |
| 2009/0092847 A1* | 4/2009 | Onoe et al. .................... 428/500 |
| 2009/0124151 A1 | 5/2009 | Shoemake |
| 2010/0222463 A1 | 9/2010 | Brady et al. |
| 2010/0292378 A1* | 11/2010 | Toita et al. .................... 524/238 |
| 2011/0081544 A1* | 4/2011 | Asai et al. ............. 428/355 CN |

FOREIGN PATENT DOCUMENTS

| | | |
|---|---|---|
| EP | 0 355 043 | 2/1990 |
| EP | 0397410 | 11/1990 |
| EP | 651088 A1 | 5/1995 |
| EP | 583086 B1 | 11/1997 |
| EP | 964026 A1 | 12/1999 |
| EP | 990729 A1 | 4/2000 |
| EP | 1039348 | 9/2000 |
| EP | 1700883 A1 | 9/2006 |
| EP | 1 978 058 | 10/2008 |
| GB | 2 078 805 | 1/1982 |
| SU | 564 325 | 7/1997 |
| WO | WO 94/01112 | 5/1994 |
| WO | WO 99/10398 | 3/1999 |
| WO | WO 99/64505 | 12/1999 |
| WO | WO 2004/050978 A1 | 6/2004 |
| WO | WO 2006/063802 | 6/2006 |
| WO | WO 2011/019593 A1 | 2/2011 |

OTHER PUBLICATIONS

Rhodapex EST-30/BLB, product datasheet, Rhodia 2007 (1 Page).
Noveon, Inc. Noveon Technical Data Sheet 237, "Neutralizing Carbopol and Pemulen Polymers in Aqueous and Hydroalcoholic Systems," 2002 (3 pages).
"Thickening Properties," Pharmaceutical Bulletin 6, 2011, Lubrizol Advanced Materials, Inc. (pp. 1-8).
Flexbond 381, Technical Data Sheet, Ashland, Inc. 2009 (2 pages).
Myasnikova, L. P., "Transitions and Relaxations," Encyclopedia of Polymer Science & Technology 2010, pp. 1-44.

* cited by examiner

CURABLE EPOXIDE CONTAINING FORMALDEHYDE-FREE COMPOSITIONS, ARTICLES INCLUDING THE SAME, AND METHODS OF USING THE SAME

CROSS-REFERENCE TO RELATED APPLICATIONS

This application is a continuation-in-part of U.S. patent application Ser. No. 13/460,367, filed Apr. 30, 2012, and incorporated herein.

BACKGROUND

The invention is directed to preparing formaldehyde-free compositions that include polymer and epoxy resin.

Binder compositions that include an epoxy-reactive polymer and water soluble epoxy-functional polymer have been disclosed for application on fibrous webs (see, e.g., U.S. Pat. No. 7,189,307). The specific types of water soluble epoxide functional polymers used in these binder compositions are quaternary ammonium epoxide polymers that include at least four pendant epoxy moieties. A certain vinyl acetate ethylene copolymer having a Tg of 0° C. is used as the epoxy-reactive polymer.

There is a need for a composition that is free of formaldehyde and that imparts good wet burst strength and non-water wicking properties to filter media used in transportation and filtration applications including, e.g., oil filters, fuel filters, air filters and panel filters.

SUMMARY

In one aspect, the invention features a composition that includes a water insoluble polymer that includes at least one of polyvinyl acetate, vinyl acetate copolymer, styrene copolymer, acrylate copolymer, and polyurethane, a polycarboxy functional polymer, and a water insoluble epoxide functional compound. In one embodiment, the composition includes from about 35% by weight to about 95% by weight of the water insoluble polymer based on total solids, from about 3% by weight to about 50% by weight of the polycarboxy functional polymer based on solids, and from about 1% by weight to about 50% by weight of the water insoluble epoxide functional compound based on solids. In another embodiment, the composition includes from about 35% by weight to about 90% by weight of the water insoluble polymer based on solids, from about 5% by weight to about 70% by weight of the polycarboxy functional polymer based on solids, and from about 4% by weight to about 40% by weight of the water insoluble epoxide functional compound based on total solids. In other embodiments, the water insoluble polymer further includes functional groups.

In some embodiments, the composition is a multi-part composition that includes a first part that includes an emulsion that includes a water insoluble polymer that includes at least one of polyvinyl acetate, vinyl acetate copolymer, styrene copolymer, and acrylate copolymer, and a polycarboxy functional polymer, and a second part that includes a water insoluble epoxide functional compound.

In other embodiments, the composition includes the polycarboxy functional polymer, the water insoluble epoxide functional compound and an emulsion that includes the water insoluble polymer. In other embodiments, the composition includes from about 35% by weight to about 95% by weight of the water insoluble polymer based on total solids, from about 3% by weight to about 50% by weight of the polycarboxy functional polymer based on total solids, and from about 1% by weight to about 50% by weight of the water insoluble epoxide functional compound based on total solids. In one embodiment, the composition includes from about 35% by weight to about 90% by weight of the water insoluble polymer based on solids, from about 5% by weight to about 70% by weight of the polycarboxy functional polymer based on total solids, and from about 4% by weight to about 40% by weight of the water insoluble epoxide functional compound based on total solids.

In one embodiment, the composition further includes a catalyst. In some embodiments, where the composition includes an emulsion, the catalyst is present in the emulsion.

In one embodiment, the water insoluble polymer further includes functional groups. In some embodiments, the functional groups include at least one of epoxide, carboxyl, hydroxyl, amino, amido, and siloxy. In other embodiments, the functional groups include carboxyl groups. In another embodiment, the water insoluble polymer includes carboxy functional polyvinyl acetate copolymer.

In other embodiments, the water insoluble polymer includes at least one of polyvinyl acetate and polyvinyl acetate copolymer.

In some embodiments, the water insoluble polymer has a Tg of at least about 15° C. In one embodiment, the water insoluble polymer has a Tg of at least about 25° C.

In some embodiments, the composition is soluble or dispersible in an organic solvent.

In other embodiments, the polycarboxy functional polymer is water soluble. In some embodiments, the polycarboxy functional polymer is derived from at least one of acrylic acid, methacrylic acid, hydroxyethyl acrylate, hydroxymethyl acrylate, fumaric acid, maleic acid, maleic anhydride, itaconic acid, itaconic anhydride, isooctyl acrylic acid, isocrotonic acid, cinamic acid, 2-methyl maleic acid, 2-methyl itaconic acid, and methyleneglutaric acid.

In other embodiments, the catalyst includes a phase transfer catalyst. In some embodiments, the catalyst includes tetraalkyl ammonium halide. In other embodiments, the catalyst includes at least one of methyltrioctyl-ammonium chloride and tetra-n-butylammonium bromide.

In one embodiment, when the composition is used to prepare a treated test substrate and the treated test substrate is tested according to the Wet Burst Strength test method, the treated substrate exhibits a wet burst strength of at least about 27 psi. In other embodiments, when the composition is used to prepare a treated test substrate and the treated test substrate is tested according to the Wet Burst Strength test method, the treated substrate exhibits a wet burst strength of at least about 30 psi. In another embodiment, when the composition is used to prepare a treated test substrate and the treated test substrate is tested according to the Wet Burst Strength test method, the treated substrate exhibits a wet burst strength of at least about 38 psi. In some embodiments, when the composition is used to prepare a treated test substrate and the treated test substrate is tested according to the Wet Burst Strength test method, the treated substrate exhibits a wet burst strength of at least 40 psi. In other embodiments, when the composition is used to prepare a treated test substrate and the treated test substrate is tested according to the Wicking test method, the treated substrate is free of wicking.

In other aspects, the invention features a treated substrate that includes a substrate that includes fibers and a dried and cured composition disclosed herein disposed on the substrate. In one embodiment, the substrate is saturated with the composition. In some embodiments, the composition is present on the treated substrate in an amount of at least 15% by weight dry add on. In other embodiments, the treated substrate exhibits a wet burst strength of at least about 30 psi, when tested according to the Wet Burst Strength test method. In another embodiment, the treated substrate exhibits a wet burst strength of at least about 34 psi, when tested according to the Wet Burst Strength test method. In some embodiments, the treated substrate exhibits a wet burst strength of at least about 40 psi, when tested according to the Wet Burst Strength test method.

In other embodiments, a filter medium includes the treated substrate. In some embodiments, the filter medium is at least one of an air filter, an oil filter, a fuel filter, and a panel filter.

In another aspect, the invention features a method of making a treated substrate, the method including contacting a substrate with a liquid composition that includes an emulsion that includes a water insoluble polymer that includes at least one of polyvinyl acetate, vinyl acetate copolymer, styrene copolymer, and acrylate copolymer, a polycarboxy functional polymer, and a water insoluble epoxide functional compound, and drying the composition. In one embodiment, the contacting includes saturating the substrate with the liquid composition.

In other aspects, the invention features a method of preparing a liquid composition disclosed herein, the method including combining the epoxide functional compound and at least one of the polycarboxy functional polymer and an emulsion that includes the water insoluble polymer.

The invention features compositions that are free of formaldehyde, do not generate formaldehyde upon cure, and impart good wet strength to fibrous substrates.

Other features and advantages will be apparent from the following description of the preferred embodiments and from the claims.

GLOSSARY

In reference to the invention, these terms have the meanings set forth below:

The term "copolymer" means a polymer derived from at least two different monomers.

The term "emulsion" means emulsion, latex, dispersion, or a combination thereof.

DETAILED DESCRIPTION

The composition includes a water insoluble polymer, a polycarboxy functional polymer, a water insoluble epoxide functional compound, and optionally a catalyst. The composition preferably is free of formaldehyde and does not emit formaldehyde during cure.

The composition can be provided in a variety of forms including, e.g., a one part system, a two part system, a powder (e.g., as a powder mixture), a liquid composition (e.g., an aqueous composition, an organic solvent composition, and combinations thereof), and in a combination of forms (e.g., at least one part can be provided as a powder and at least one other part is provided in the form of a liquid composition). A useful multi-part system includes a first part that includes the water insoluble polymer (e.g., an emulsion polymer) and the polycarboxy functional polymer, and a second part that includes the water insoluble epoxide functional compound.

When the composition is in the form of a liquid composition, the liquid composition can include any amount of solids (i.e., the components remaining after drying one gram of the composition at 130° C. for two hours) including, e.g., from about 3% by weight to about 85% by weight, from about 10% by weight to about 80% by weight, from about 20% by weight to about 75% by weight, from about 20% by weight to about 70% by weight, from about 20% by weight to about 65% by weight, or even from about 20% by weight to about 30% by weight solids. The liquid composition can be formulated to have a relatively higher solids content, which subsequently can be diluted by the end user to have a relatively lower solids content. The liquid composition preferably is stable for at least six months at room temperature (i.e., it maintains a viscosity suitable for application to a substrate for at least six months when maintained at room temperature).

When in the form of an aqueous composition, the aqueous composition preferably exhibits a pH of no greater than about 7, no greater than about 6, no greater than about 5, at least 2, at least 2.5, from about 2 to about 6, from about 3 to about 5, or even about 4. The aqueous composition, or at least one component of the aqueous composition, optionally is soluble in organic solvent (e.g., acetone, methylethyl ketone, and primary alcohols including, e.g., methanol, ethanol, and isopropanol).

When the composition is used to prepare a treated test substrate, the treated test substrate preferably exhibits a wet burst strength of at least 27 pounds per square inch (psi), at least about 30 psi, at least about 34 psi, at least about 38 psi, at least about 39 psi, at least about 40 psi or even at least about 41 psi when tested according to the Wet Burst Strength test method, a dry burst strength of at least about 50 psi, at least about 70 psi or even at least about 80 psi, when tested according to the Dry Burst Strength test method, no greater than 0.2 inches of wicking, or even is free of wicking, when tested according to the Wicking test method, or a combination of such properties.

The First Part

The first part includes the water insoluble polymer, and optionally at least one of a liquid carrier (e.g., water, organic solvent, and combinations thereof) and a stabilizer. The water insoluble polymer preferably is in the form of an emulsion, but can be in a variety of other forms including, e.g., a solid (e.g., a powder) and a solution polymer (e.g., a solution polymer prepared in water, organic solvent, and combinations thereof). Examples of useful commercially available emulsions include emulsions available under the trade designations PD8258, PD0330, PD1062AF, PN3133M, PD0128, PD0025, PD2210, PN3610K, and PN3178Z from H.B. Fuller Company (Vadnais Heights, Minn.).

Water Insoluble Polymer

The water insoluble polymer preferably has a glass transition temperature (Tg) of at least 10° C., at least about 15° C., at least about 25° C., at least about 30° C., at least about 35° C., at least about 40° C., no greater than about 70° C., no greater than about 60° C., from about 25° C. to about 60° C., or even from about 30° C. to about 55° C. The water insoluble polymer optionally is in the form of particles and is sometimes referred to herein as an emulsion polymer. Useful classes of water insoluble polymers include, e.g., homopolymers, copolymers, and combinations thereof, of ethylenically unsaturated monomers. Useful examples of water insoluble polymers include polyvinyl acetate, vinyl acetate copolymers, styrene copolymers, acrylate copolymers, vinyl acrylic copolymers, polyurethanes, and combinations thereof.

Useful vinyl acetate copolymers include, e.g., vinyl acetate copolymers derived from vinyl acetate and alkyl(meth)acrylates, vinyl acetate and unsaturated dialkyldicarboxylic acids (e.g., vinyl acetate dioctyl maleate copolymer and vinyl acetate dibutyl maleate copolymer), and vinyl acetate and ethylene (e.g., vinyl acetate vinyl neononanoate copolymer, vinyl acetate vinyl neodecanoate copolymer, and vinyl acetate vinyl neoundecanoate copolymer), and combinations thereof. Useful vinyl acetate copolymers can be made from vinyl ester monomers available under the VEOVA series of trade designations form Shell Chemical Co. (Houston, Tex.) including, e.g., VEOVA 9 vinyl neononanoate, VEOVA 10 vinyl neodecanoate, and VEOVA 11 vinyl neoundecanoate.

Useful styrene copolymers include, e.g., styrene copolymers typically derived from styrene and alkylacrylates including, e.g., C1-C8 alkyl acrylates (e.g., styrene butyl acrylate, styrene-acrylic acid, styrene-2-ethylhexyl acrylate, styrene-methyl acrylate, styrene-ethyl acrylate, and styrene-butyl acrylate), and combinations thereof.

Useful acrylate polymers and copolymers include, e.g., butyl acrylate-methyl methacrylate copolymers, methyl acrylate polymers, ethyl acrylate polymers, butyl acrylate polymers, carboxylated alkyl acrylate polymers and copolymers, and combinations thereof. Useful commercially available acrylate polymers are available under the trade designation PD 0400N from H.B. Fuller Company.

Useful water insoluble polymers are derived from a variety of ethylenically unsaturated monomers including, e.g., vinyl esters (e.g., vinyl acetate, vinyl versatate, vinyl formate, vinyl propionate, vinyl isobutyrate, vinyl valerate, vinyl pivalate, vinyl 2-ethylhexanoate, vinyl esters of saturated branched monocarboxylic acids (e.g., vinyl nonoate and vinyl decanoate), vinyl esters of long chain (e.g., from 10 to 20 carbon atoms) saturated and unsaturated, branched and unbranched fatty acids, (e.g., vinyl laurate or vinyl stearate), vinyl esters of benzoic acid, and combinations thereof), vinyl ethers, vinyl halides (e.g., vinyl chloride), vinylidene halides (e.g., vinylidene chloride), alkyl vinyl ketones, N-vinyl carbazole, N-vinyl pyrrolidone, vinyl pyridine (e.g., 2-vinylpyridine and 4-vinylpyridine), ethylenically unsaturated aromatic compounds (e.g., styrene, alkyl styrenes, and chlorostyrene), ethylenically unsaturated acids, ethylenically unsaturated anhydrides, acrylates (e.g., alkyl(meth)acrylates, allyl(meth)acrylates, and hydroxylated alkyl(meth)acrylates), acrylamides, substituted acrylamides, acrylonitrile, methacrylonitrile, olefins, divinyl benzene, vinyl alkoxy silane (e.g., vinyl triethoxy silane), vinyl diethylmethyl silane, vinyl methyl dichlorosilane, triphenyl vinyl silane, 1-vinyl-1-methyl-sila-14-crown-5, C1-C8 alkyl crotonates, di-n-butyl maleate, dioctylmaleate, di-allyl maleate, di-allylmalonate, a-vinyl naphthalene, p-vinyl naphthalene, vinyl ethylene carbonate, epoxy butene, 3,4-dihydroxybutene, butadiene, ethylformamide, N-vinylformamide, N-vinyl-N-methylformamide, N-vinylimidazole, 1-vinyl-2-methylimidazole, 1-vinyl-2-methylimidazoline, N-vinylcaprolactam, allyl alcohol, diallyldimethylammonium chloride, acrolein, methacrolein, vinylcarbazole, 4-vinyl-1,3-dioxolan-2-one, 2,2-dimethyl-4 vinyl-1,3-dioxolane, 3,4-di-acetoxy-1-butane, and combinations thereof.

Useful vinyl ether monomers include, e.g., methyl, ethyl, propyl, isobutyl, 2-ethylhexyl, cyclohexyl, 4-hydroxybutyl, decyl, dodecyl, octadecyl, 2-(diethylamino)ethyl, 2-(di-n-butylamino)ethyl and methyldiglycol vinyl ether, the corresponding allyl alkyl ethers, and combinations thereof.

Useful ethylenically unsaturated acid and ethylenically unsaturated anhydride monomers include, e.g., acrylic acid, methacrylic acid, crotonic acid, itaconic acid, fumaric acid, and maleic acid, and anhydrides thereof, monovinyl adipate, and combinations thereof.

Useful acrylate monomers include, e.g., methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethyl hexyl acrylate, octyl acrylate, octyl methacrylate, iso-octyl acrylate, iso-octyl methacrylate, trimethyolpropyl triacrylate, hydroxyethyl acrylate, hydroxyethyl methacrylate, hydroxypropyl acrylate, hydroxypropyl methacrylate, hydroxybutyl acrylate, hydroxybutyl methacrylate, hydroxybutenyl methacrylate, glycidyl methacrylate, acetoacetoxy ethyl methacrylate, acetoacetoxy ethyl acrylate, allyl methacrylates, methyoxybutenyl methacrylate, isobornyl methacrylate, vinyl(meth)acrylates, isopropenyl(meth)acrylate, cycloaliphaticepoxy(meth)acrylates, carbodiimide methacrylate, and combinations thereof.

Useful acrylamide monomers include, e.g., acrylamide, methacrylamide, butyl acrylamide, ethyl acrylamide, N-tert-butylacrylamide, N-methylol(meth)acrylamide, and combinations thereof.

Useful olefin monomers include, e.g., ethylene, propylene, butene, isobutylene, pentene, cyclopentene, hexane, cyclohexene, octane, 1-3 butadiene, chloroprene, cyclobutadiene, isoprene, and combinations thereof.

The water insoluble polymer optionally includes functional groups capable of reacting with the epoxide groups present on the epoxide functional compound or the polycarboxy polymer during curing. Useful functional groups include, e.g., epoxide groups, carboxyl, hydroxyl, amino, amido, siloxy, and combinations thereof. Suitable water insoluble polymers that include functional groups include carboxylated styrene acrylic copolymers, styrene-acrylic-silane copolymers, vinyl acetate-acrylic acid copolymers, vinyl acetate-silane copolymers, vinyl acetate-glycidyl methacrylate copolymers, carboxylated acrylate copolymers, carboxylated styrene-butadiene copolymers, and combinations thereof.

Functional groups can be incorporated into the water insoluble polymer by copolymerization, grafting or a combination thereof, of the base polymer (or monomer used to form the polymer) with a comonomer, an oligomer, another polymer, or a combination thereof. One useful method of incorporating functional groups into the emulsion polymer through copolymerization includes polymerizing the emulsion polymer in the presence of monomers having functional groups. Examples of such monomers include glycidyl methacrylate, acetoacetoxy ethyl methacrylate, glycerol carbonate acrylate, vinyl ethylene carbonate, hydroxyl ethyl methacrylate, t-butylaminoethyl methacrylate, dimethylamino methacrylate, m-isopropenyl-alpha, alpha-dimethylbenzyl isocyanate, acrylamide, N-methylolacrylamide, N-isobutoxy methylacrylamide, and combinations thereof.

The mixture used to form the water insoluble polymer optionally includes multifunctional ethylenically unsaturated monomers suitable examples of which include, e.g., butanediol divinyl ether, trimethylolpropane trivinyl ether, diallyl phthalate, diallyl maleate, triallyl cyanurate, ethylene glycol di(meth)acrylate, 1,2-propylene glycol di(meth)acrylate, 1,4-butanediol di(meth)acrylate, hexanedioldi(meth)acrylate, neopentyl glycol di(meth)acrylate, 3-methylpentanediol di(meth)acrylate, trimethololpropane tri(meth)acrylate, diacrylates or dimethacrylates of polyethylene glycols and polypropylene glycols having a molecular weight from 200 to 9000, and combinations thereof.

When the water insoluble polymer is present in an emulsion, the emulsion preferably includes no greater than about 98% by weight, at least about 70% by weight, at least about 80% by weight, or even from about 85% by weight to about 98% by weight water insoluble polymer based on the weight of solids in the emulsion.

The composition preferably includes no greater than about 95% by weight, at least about 35% by weight, at least about 50% by weight, at least about 55% by weight, at least about 55% by weight, from about 35% by weight to about 90% by weight, or even from about 60% by weight to about 90% by weight water insoluble polymer based on the weight of solids in the composition.

Stabilizer

The stabilizer stabilizes the water insoluble polymer in the emulsion. Useful stabilizers include, e.g., protective colloids, surfactants, and combinations thereof. The emulsion preferably includes no greater than about 10% by weight, at least about 1 by weight, at least about 3% by weight, at least about 5% by weight, from about 2% by weight to about 10% by weight, or even from about 10% by weight to about 20% by weight stabilizer based on the weight of solids in the emulsion.

Protective Colloid

Useful classes of protective colloid stabilizers include, e.g., polysaccharides (e.g., starch and starch derivatives), polyvinyl alcohol, polyvinyl alcohol copolymers, cellulose, cellulose derivatives (e.g., hydroxymethyl cellulose, hydroxyethyl cellulose, hydroxypropyl cellulose, carboxymethyl cellulose, carboxyethyl cellulose, and combinations thereof), polyethylene glycol, polypropylene glycol, copolymers of ethylene glycol and propylene glycol, polyvinyl ethers, dextran, polyvinyl pyrrolidone, polyvinyl pyridine, polyvinyl imidazole, polyvinyl succinimide, polyvinyl-2-methylsuccinimide, and polyvinyl-1,3-oxazolid-2-one, polyvinyl-2-methylimidazoline, sorbitol acrylate, sorbitol methacrylate, and combinations thereof.

Useful polysaccharides include natural starches including, e.g., cornstarch, potato starch, wheat starch, rice starch, tapioca starch, sago starch, sorghum starch, cassava starch, pea starch, and combinations thereof. Hydrolytically and enzymatically degraded starches are also suitable, examples of which include dextrins (e.g., white and yellow dextrins and maltodextrins), oxidized starches (e.g., dialdehyde starch), chemically modified starches (e.g., starches esterified with organic and inorganic acids (e.g., phosphated and acetylated starches), starches etherified with organic halogen compounds, epoxides, sulfates and combinations thereof, and combinations thereof.

The protective colloid optionally is polymerizable, i.e., it includes at least one ethylenically unsaturated functional group capable of reacting with other monomers or polymers. The protective colloid optionally is polymerized with the water insoluble polymer of the emulsion, with the monomers from which the water insoluble polymer is derived, or a combination thereof. A polymerizable protective colloid that is polymerized with a water insoluble polymer is referred to herein as both a polymerizable colloid and a polymerized colloid. Examples of suitable protective colloids that are polymerizable with the water insoluble monomers include sorbitol acrylate, sorbitol methacrylate, cellulose acrylamide adduct, hydroxyethylcellulose acrylate, hydroxyethylcellulose methacrylate, methylcellulose acrylate, methylcellulose methacrylate, methylcellulose crotonate, and combinations thereof.

When a protective colloid is present in the emulsion, the emulsion preferably includes at least about 0.5% by weight, no greater than 20% by weight, no greater than 15% by weight, no greater than 10% by weight, no greater than 5% by weight, no greater than 3% by weight, from about 0.5% by weight to about 20% by weight, or even from about 0.5% by weight to about 10% by weight protective colloid based on solids in the emulsion.

Surfactant

Useful classes of surfactants include, e.g., nonionic, anionic, cationic and amphoteric surfactants, and combinations thereof. Suitable nonionic surfactants include, e.g., alkyl and alkylaryl polydiol ethers (e.g., ethoxylation products of lauryl, oleyl and stearyl alcohols), alkyl phenol glycol ethers (e.g., ethoxylation products of octyl or nonylphenol), and combinations thereof.

Suitable cationic surfactants include, e.g., quaternized amino alkoxylates, alkyl betaines, alkylamidobetaines, alkylamidosulfobetaines, and combinations thereof.

The surfactant optionally is polymerizable, i.e., it includes at least one ethylenically unsaturated functional group capable of reacting with other monomers or polymers. The surfactant optionally is polymerized with the water insoluble polymer of the emulsion, monomers from which the water insoluble polymer is prepared, or a combination thereof. A polymerizable surfactant that is polymerized with a water insoluble polymer is referred to herein as both a polymerizable surfactant and a polymerized surfactant.

The surfactant optionally is reactive, i.e., it includes functional groups that are capable of reacting with the solution polymer during cure. Examples of suitable reactive surfactants include sulfate and sulfonate salts of nonyl phenol and alkyl alcohol ethoxylates, sodium vinyl sulfonate, sodium-1-allyloxy-2-hydroxy propane sulfonate, alkyl ethoxylate sulfates, alkyl phenol ethoxylate sulfates, alkyl ethoxylates, alkyl phenol ethoxylates, methoxy(meth)acrylates, ethoxy (meth)acrylates, and combinations thereof.

When a surfactant is present in the emulsion, the emulsion preferably includes from about 0.01% by weight to no greater than about 5% by weight or even from about 0.01% by weight to no greater than about 10% by weight surfactant based on solids in the emulsion.

Liquid Carrier

The first part can include any amount of liquid carrier including, e.g., from about 25% by weight to about 80% by weight, from about 30% by weight to about 70% by weight, or even from about 45% by weight to about 55% by weight liquid carrier based on the total weight of the first part.

Optional Components

The first part optionally includes additional components including, e.g., additional polymers, epoxy-group containing compounds, additional surfactants, crosslinking agents, multifunctional ethylenically unsaturated monomers, antifoaming agents, colorants, dyes, pigments, preservatives, pH modifiers (e.g., sodium bicarbonate), rheology control agents, fungicides, bactericides, antimicrobials, adhesion promoters, wax dispersions, resin dispersions, oils, fire retardant agents, antioxidants, latent acid catalysts, acid catalysts, and combinations thereof. The optional components can be added to the reaction mixture, the emulsion, or post-added to the aqueous composition.

Polymerization Process

The water insoluble polymer preferably is prepared by emulsion polymerization and optionally can be prepared by free-radical bulk, solution, suspension, and dispersion polymerization. Aqueous emulsion polymerization is also known as a free radical initiated chain polymerization in which a monomer, or a mixture of monomers, is polymerized in the presence of at least one of a protective colloid and a surfactant. Other components are optionally present during the emulsion polymerization process including, e.g., chain transfer agent, free radical initiator, anti-foaming agent, coalescent, wetting agent, reducer, buffer, and freeze thaw additive. Useful emulsion polymerization processes include, e.g., continuous and batch processes.

The polymerization is preferably conducted in the presence of a free radical initiator. Suitable classes of free radical initiators include oxidizing agents including, e.g., peroxides, hydroperoxides, persulfates, percarbonates, peroxo esters, hydrogen peroxide, azo compounds, and combinations thereof. Suitable free radical initiators include, e.g., hydrogen peroxide, dibenzoyl peroxide, dicyclohexyl peroxodicarbonate, dibenzoyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, t-butyl pivalate, tert-amyl perpivalate, tert-butyl perpivalate, tert-butyl perneohexanoate, tert-butyl per-2-ethylhexanoate, tert-butyl perbenzoate, peroxodisulfates of lithium, sodium, potassium and ammonium, azodiisobutyronitrile, 2,2'-azobis(2-amidinopropane)dihydrochloride, 2-(carbamoylazo)isobutyronitrile, 4,4-azobis(4-cyanovaleric acid), and combinations thereof.

The free radical initiator alternatively is part of an initiator system that includes an oxidizing agent (suitable examples of which are set forth above) and a reducing agent. Suitable reducing agents include, e.g., sodium formaldehyde-sulfoxylate, ferrous salts, sodium dithionite, sodium hydrogen sulfite, sodium sulfite, sodium thiosulfate, sodium bisulphite, ascorbic acid, erythorbic acid, salts of ascorbic acid and erythorbic acid, and combinations thereof. The initiator system optionally includes a transition metal catalyst including, e.g., salts of iron, cobalt, nickel, copper, vanadium, and manganese. Suitable catalysts include, e.g., iron (II) sulfate, cobalt (II) chloride, nickel (II) sulfate, copper (I) chloride, and combinations thereof.

The initiators can be employed alone or in a mixture with one another, one useful mixture includes hydrogen peroxide and ammonium persulfate. For polymerization in an aqueous medium it is preferred to employ water-soluble initiators.

The free radical initiator can be added to the polymer emulsion as a solid or can be dissolved in a solvent and added as a solution. Addition of the free radical initiator in solution can aid in mixing and can provide a more even distribution of the free radical initiator in the polymer emulsion. The free radical initiator can be added to the polymer emulsion during a single addition step or can be added to the polymer emulsion more than once, providing a step wise addition. Step wise addition is useful where the polymer emulsion includes at least two different free radical initiators.

The fee radical initiator preferably is present in the emulsion reaction mixture in an amount of from about 0.01% by weight to no greater than 2% by weight, no greater than 5% by weight, from about 0.01% by weight to about 0.5% by weight, from about 0.1% by weight to about 1% by weight, from about 0.15% by weight to about 0.75% by weight, or even from about 0.5% by weight to about 0.7% by weight based on the weight of the monomers in the emulsion reaction mixture.

The composition used to form the polymer emulsion optionally includes a chain transfer agent. Suitable chain transfer agents include, e.g., sodium hypophosphite, thioglycolic acid, mercaptans including, e.g., primary octyl mercaptan, 2-mercaptoethanol, n-dodecylmercaptan, n-octylmercaptan, t-dodecyl mercaptan, iso-octyl thioglycolurate, mercapto carboxylic acids having from 2 to 8 carbon atoms, and their esters, examples of which include 3-mercapto propionic acid and 2-mercapto propionic acid, halogenated hydrocarbons including, e.g., carbonbromo compounds (e.g., carbon tetrabromide and bromotrichloromethane), organic solvents (e.g., methanol, ethanol, and isopropanol), and combinations thereof. The chain transfer agent can be present in the composition used to form the polymer emulsion in an amount of no greater than 5% by weight, from about 0.1% by weight to about 4% by weight, or even from about 0.1% by weight to about 2% by weight based on the monomer weight.

Polycarboxy Functional Polymer

The polycarboxyl functional polymer of the composition preferably is water soluble. The polycarboxy functional polymer is derived from water soluble monomers and optionally monomers that are partially water soluble, water dispersible, water insoluble, and combinations thereof.

Useful polycarboxy functional polymers include, e.g., $\alpha,\beta$-ethylenically unsaturated mono- and di-carboxylic acid in polymerized or copolymerized form including polyacrylic acid, polymethacrylic acid, (meth)acrylic acid-hydroxyalkyl acrylate copolymers (e.g., acrylic acid-hydroxyethyl acrylate copolymer, methacrylic acid-hydroxyethyl acrylate copolymer, methacrylic acid hydroxymethyl acrylate, and acrylic acid hydroxymethyl acrylate), maleic anhydride copolymers, acrylic acid maleic acid copolymers, acrylic acid maleic acid hydroxyethylacrylate copolymers, and combinations thereof.

The polycarboxy functional polymer can be derived from various classes of carboxy functional monomers including, e.g., monocarboxylic acid, dicarboxylic acid, and polycarboxylic acid monomers including, e.g., acrylic acid, methacrylic acid, unsaturated dicarboxylic acids (e.g., fumaric acid, maleic acid, and itaconic acid), acrylic acid ester, methacrylic acid ester, and combinations thereof. Suitable acrylic acid esters and methacrylic acid esters include, e.g., methyl acrylate, ethyl acrylate, phenyl acrylate, butyl acrylate, propyl acrylate, 2-ethylhexyl acrylate, isobornyl acrylate, 2-hydroxyethyl acrylate, 2-hydroxypropyl acrylate, 2-chloroethyl acrylate, allyl acrylate, cyclohexyl acrylate, decyl acrylate, isodecyl acrylate, methyl methacrylate, ethyl methacrylate, butyl methacrylate, propyl methacrylate, 2-ethylhexyl methacrylate, phenyl methacrylate, isobornyl methacrylate, 2-hydroxyethyl methacrylate, 2-hydroxypropyl acrylate, 2-chloroethyl methacrylate, allyl methacrylate, vinyl methacrylate, cyclohexyl methacrylate, decyl methacrylate, isodecyl methacrylate, and combinations thereof.

The polycarboxy functional polymer preferably is derived from 100% by weight, no greater than 98% by weight, no greater than about 90% by weight, no greater than about 80% by weight, no greater than about 75% by weight, at least 30% by weight, at least about 40% by weight, at least about 50% by weight, at least about 60% by weight, or even at least about 65% by weight ethylenically unsaturated carboxylic acid monomer based on the weight of the polycarboxy functional polymer.

The polycarboxy functional polymer optionally is also derived from $\alpha,\beta$-ethylenically unsaturated hydroxy functional monomers. Useful $\alpha,\beta$-ethylenically unsaturated hydroxy functional monomers include, e.g., $\alpha,\beta$-ethylenically unsaturated monohydroxy functional monomers (e.g., hydroxy alkyl acrylate monomers including, e.g., hydroxymethyl acrylate, hydroxyethyl acrylate, 2-hydroxyethyl acrylate, hydroxypropyl acrylate, and hydroxybutyl acrylate, hydroxy alkyl methacrylates including, e.g., hydroxymethyl methacrylate hydroxyethyl methacrylate, and hydroxypropyl methacrylate, and combinations thereof), and combinations thereof.

The polycarboxy functional polymer optionally is also derived from water insoluble monomers (e.g., methyl methacrylate, styrene, and combinations thereof), other monomers (e.g., vinyl acetate, butyl acrylate, methyl acrylate, ethyl acrylate, 2-ethyl hexyl acrylate, and combinations thereof), and combinations thereof in an amount of from 0% by weight to no greater than 35%, no greater than 25% by weight, or even no greater 10% by weight based on the total weight of the monomers in the mixture.

The polycarboxy polymer is optionally present in the first part with the water insoluble polymer (e.g., the emulsion).

When present in the first part, the first part preferably includes no greater than about 70% by weight, at least about 3% by weight, at least about 5% by weight, from about 3% by weight to about 50% by weight, from about 4% by weight to about 25% by weight, or even from about 6% by weight to about 20% by weight of the polycarboxy functional polymer based on the weight of solids in the first part.

The composition preferably includes no greater than about 70% by weight, at least about 3% by weight, at least about 5% by weight, from about 3% by weight to about 50% by weight, from about 4% by weight to about 25% by weight, or even from about 6% by weight to about 20% by weight polycarboxy functional polymer based on the weight of solids in the composition.

Water Insoluble Epoxide Functional Compound

The epoxide functional compound is water insoluble. Useful epoxide functional compounds include polyglycidyl ethers of polyhydric alcohols, polyhydric thiols, and polyhydric phenols. Suitable epoxide functional compounds include, e.g., bisphenol-A/epichlorohydrin-based epoxide functional compounds.

Suitable commercially available epoxide functional compounds include, e.g., epoxy resins available under the EPON series of trade designations form Momentive Performance Materials Inc. (Houston, Tex.) including EPON 826 and 828 epoxide functional polyglycidyl ethers of bisphenol A and under the DER 331 trade designation from The Dow Chemical Company (Midland, Mich.).

The composition preferably includes at least about 1% by weight, at least about 2% by weight, at least about 4% by weight, no greater than about 40% by weight, no greater than about 50% by weight, from about 2.5% by weight to about 50% by weight, from about 5% by weight to about 40% by weight, or even from about 5% by weight to about 20% by weight water insoluble epoxide functional compound based on the weight of solids in the composition.

Catalyst

The composition preferably includes a catalyst. Where the composition is provided in multiple parts, the catalyst can be provided in any one or more of the parts including, e.g., the water insoluble polymer (e.g., an emulsion), the polycarboxy functional polymer, the epoxide functional compound, and in combinations thereof. Useful classes of catalysts include, e.g., acid catalysts, phase transfer catalysts, latent acid catalysts, and combinations thereof. Suitable catalysts include, e.g., phosphonium salts (e.g., ethyltriphenyl phosphonium acetate, ethyltriphenyl phosphonium phosphate, ethyltriphenyl phosphonium acid acetate, and combinations thereof), quaternary ammonium salts (e.g., alkylbenzyl dimethyl ammonium chloride, benzyltrimethyl ammonium chloride, methyltrioctyl ammonium chloride, tetraethyl ammonium bromide, N-dodecyl pyridinium chloride, tetraethyl ammonium iodide, and combinations thereof), dicyanamides, paratoluene sulfonic acid, and combinations thereof.

When the optional catalyst is present in the composition, it preferably is present in an amount of from 0% by weight to about 5% by weight, from about 0.1% by weight to about 3% by weight, or even from about 0.1% by weight to about 2% by weight based on the weight of the epoxide functional compound.

Optional Components in the Composition

Condensation Accelerator

The composition optionally includes a condensation accelerator that speeds the condensation reaction (e.g., crosslinking and thermosetting) that occurs as the composition cures. Suitable condensation accelerators include, e.g., phosphorus-based catalysts including, hypophosphorous acid (e.g., sodium hypophosphite and potassium hypophosphite) and phosphoric acid, para toluene sulfonic acid, any strong acids (e.g., hydrochloric acid, sulfuric acid, nitric acid, nitrous acid, perchloric acid, chloric acid, and trichloroacetic acid), and all of the corresponding ammonium salts of the aforementioned acids (e.g., ammonium chloride, diammonium phosphate, ammonium nitrate, ammonium perchlorate, ammonium chlorate, ammonium bromide, ammonium iodide and ammonium sulfate), and acidic metal salts (e.g., aluminum chloride, iron chloride, zirconium oxychloride, chromic nitrate, chromic perchlorate, aluminum nitrate, iron nitrate, and zinc nitrate), and combinations thereof.

The condensation accelerator can be present in the composition in an amount of from 0% by weight to no greater than about 5% by weight, or even from about 0.1% by weight to about 2% by weight based on the weight of solids.

The pH of the composition can be adjusted using any suitable alkaline component including, e.g., amines (e.g., alkylamines including, e.g., ethylene diamine, triethyleamine, and diethylene triamine, morpholine, 2-amino-2-methyl-1-propanol, and alkanolamines (e.g., mono-, di- and triethanolamines including e.g., monoethanolamine), cyclic amines (e.g., pyrrolidine, piperidine, piperazine and morpholine), ammonia, ammonium hydroxides (e.g., t-butylammonium hydroxide), alkali metal hydroxides (e.g., sodium hydroxide and potassium hydroxide), metal carbonates (e.g., sodium carbonate), and combinations thereof.

Polyfunctional Components

The composition optionally includes a polyfunctional component including, e.g., polyacid components, polyfunctional components capable of reacting with the carboxyl group of the solution polymer, and combinations thereof.

Useful polyacid components include those polyacid components that are compatible with an aqueous composition. Suitable polyacid components include, e.g., diacids (e.g., maleic acid, maleic anhydride, fumaric acid, succinic acid, succinic anhydride, citric acid, adipic acid, glutaric acid, tartaric acid, itaconic acid, glutaconic acid, muconic acid, traumatic acid, and trimellitic acid), triacids (e.g., hemimellitic acid, trimesic acid, tricarballylic acid), higher order polyacids including, e.g., 1,2,3,4-butanetetracarboxylic acid, pyromellitic acid, carboxylic acid oligomers, acrylic acid-vinyl acetate compounds, and combinations thereof.

The polyacid component can be in the form of a partially neutralized polyacid component or a polyacid component that is not neutralized. The polyacid component can be neutralized with any of a variety of pH neutralizing agents including bases including, e.g., amines (e.g., alkylamines including, e.g., ethylene diamine, triethyleamine, and diethylene triamine, morpholine, 2-amino-2-methyl-1-propanol, and alkanolamines (e.g., monoalkanolamines including e.g., monoethanolamine)), ammonium hydroxides (e.g., t-butylammonium hydroxide), metal hydroxides (e.g., sodium hydroxide and potassium hydroxide), metal carbonates (e.g., sodium carbonate), and combinations thereof. The polyacid component can be neutralized to a pH of no greater than 6, no greater than 5, at least 2, at least 2.5, from about 2 to about 6, from about 3 to about 5, or even about 4.

When present, the composition includes at least 1% by weight, at least 5% by weight, at least about 10% by weight, at least 15% by weight, at least 20% by weight, at least 25% by weight, no greater than about 65% by weight, no greater than about 60% by weight, no greater than about 55% by weight, from about 20% by weight to about 65% by weight, or even from about 25% by weight to about 55% by weight of the polyacid component based on the weight of the solids in the composition.

Examples of polyfunctional component capable of reacting with the carboxyl group of the solution polymer include polyols, i.e., compounds having at least two hydroxyl groups. Useful polyols include, e.g., ethylene glycol, glycerol, pentaerythritol, trimethylol propane, sorbitol, sucrose, glucose, resorcinol, catechol, pyrogallol, glycollated ureas, 1,4-cyclohexane diol, alkanolamines (e.g., diethanolamine, triethanolamine, dipropanolamine, and di-isopropanolamine), reactive polyols including, e.g., β-hydroxyalkylamides (e.g., bis-[N,N-di(.beta.-hydroxyethyl)]adipamide), and combinations thereof. The aqueous composition preferably includes from 0% by weight to 20% by weight polyol based on solids.

Other Components

The composition optionally includes a variety of additional components including, e.g., additional polymers, latent acid catalysts, water-miscible organic solvent, wax dispersions, adhesion promoting agents (e.g., silanes and boranes), fillers, biocides, anti-mycotics including, e.g., fungicides and mold inhibitors, plasticizers, anti-foaming agents, colorants, pigments, antioxidants, odor masking agents, and combinations thereof.

Suitable additional polymers include, e.g., additional water soluble polymers, partially water soluble polymers, and combinations thereof. Examples of suitable additional polymers include the solution polymers set forth above, starch, cellulose derivatives (e.g., hydroxymethyl cellulose, hydroxyethyl cellulose, hydroxypropyl cellulose, carboxymethyl cellulose, carboxyethyl cellulose, and combinations thereof), polyvinyl alcohol, surfactant, and combinations thereof.

Examples of useful latent acid catalysts include ammonium salts, e.g., ammonium chloride, ammonium chlorate, ammonium bromide, ammonium iodide, ammonium fluoride, ammonium nitrate, ammonium perchlorate, ammonium para-toluene sulfonate, ammonium sulfate, ammonium methansulfonate, ammonium phenylsulfonate, and combinations thereof, triethylamine sulfate, and combinations thereof.

The composition can be prepared by mixing the various components including, e.g., the emulsion polymer, the carboxy functional polymer, and any optional components (e.g., water, organic solvent, the optional polyacid monomer, the optional polyfunctional component, the condensation accelerator, the latent acid catalyst, and the pH neutralizing agent) using any suitable mixing technique.

Use

The composition preferably is in the form of a liquid before use. When one or more of the components is in the form of the powder, the component can be reconstituted with a suitable liquid carrier and combined with the other components to form a liquid composition. The liquid composition can be applied to a variety of substrates and then crosslinked via a condensation reaction, e.g., through the application of energy (e.g., heating) and evaporation of water, to form the condensed (i.e., crosslinked), dried polymer. Preferably the liquid composition is heated in an oven at a temperature and for a period sufficient to condense the polymer, or even from about 130° C. to about 270° C. for from less than a minute to about 30 minutes, from about 1 minute to about 20 minutes, or even no greater than 10 minutes. The drying and curing functions can be carried out in a single step or in at least two steps. One useful method, which is known as B-staging, includes heating the composition at a temperature and for a time sufficient to substantially dry but not substantially cure the composition, and then, at a later point in time, heating the composition for a second period to effect curing.

The liquid composition is particularly useful as a composition for treating fibrous substrates (e.g., filters (e.g., oil filters, fuel filters, panel filters, automotive vehicle filters, and air filters (e.g., filters used in furnaces, air conditioners, air purifiers, and humidifiers)) and in methods of making fibrous substrates. The composition is particularly suitable for use on filter media that experience pressure or force from a flowing fluid (e.g., a liquid (e.g., oil and fuel) and gas (e.g., air)). The cured composition can be used as a binder to maintain fibers in a fixed relation to each other, to consolidate fibers in the x, y and z directions, and combinations thereof. The cured composition also can impart integrity and strength to a fibrous filter medium. The cured composition can be present on the fibrous substrate in any amount including, e.g., at least about 1% by weight, at least about 15% by weight, from about 1% by weight to about 30% by weight, or even from about 15% by weight to about 25% by weight based on the weight fibrous substrate.

The composition is useful for treating a variety of substrates including woven and nonwoven substrates that include, e.g., fibers (e.g., polymeric fibers including, e.g., polyolefin (e.g., polyethylene and polypropylene), polyester, polyacrylonitrile, polyvinyl acetate, polyvinyl chloride, polyamide, polyacrylamide, rayon, cellulose (e.g., wood pulp and cotton), glass, and combinations thereof), particulate matter (e.g., particles, powders, and granules) of various materials including, e.g., silica, sand, cement, potash, stone, granite, marble, glass (e.g., microspheres, microparticles, particles, microtubes, and combinations thereof), and combinations thereof.

The fibers can be in a variety of forms including, e.g., individual fibers, nonwoven and woven fibrous webs, sheets, lofty fibrous products, filaments, strands, ropes, rolls, batts, reinforcing mats for roofing applications, mats for flooring applications, reinforcement scrims, and combinations thereof.

The composition is also useful in composites including, e.g., composites that include inorganic fillers (e.g., sand, silica, cement, potash, stone, granite, marble, glass (e.g., microspheres, microparticles, particles, microtubes, and combinations thereof)), cellulose (e.g., wood composites), and combinations thereof, which can be used in a variety of applications including, e.g., countertops, sinks, toilet constructions (e.g., basins and tanks), pavers (e.g., bricks), doors, door cores, planks, boards, and combinations thereof. The composition can be used in a composite forming process that includes applying heat and pressure.

The composition can be applied using a variety of application techniques including, e.g., spraying, saturating (e.g., immersing), coating, e.g., gravure, roll coating, curtain coating, brush coating, beater deposition, and combinations thereof.

The invention will now be described by way of the following examples. All parts, ratios, percentages and amounts stated in the Examples are by weight unless otherwise specified.

EXAMPLES

Test Procedures

Test procedures used in the examples include the following. The procedures are conducted at room temperature (i.e., an ambient temperature of from about 20° C. to about 25° C.) unless otherwise specified.

Test Substrate

The test substrate is a base filter paper stock that includes primarily cellulosic fibers and has a basis weight of about 100 grams per square meter, a pore size of approximately 12 microns, and a thickness of approximately 0.34 millimeters. A commercially available example of the substrate is Sheet 19N base filter paper stock from Ahlstrom Filter Co. (Taylorville, Ill.).

Treated Test Substrate Preparation

The sample composition to be tested is applied to a test substrate in liquid form in an amount sufficient to achieve a treated substrate that includes a target dry add on of about 20% by weight. The sample composition is then dried and cured to achieve crosslinking. The resulting sample is referred to in the test methods set forth below as the treated substrate.

Wet Burst Strength Test Method

The wet burst strength is measured according to ASTM D 774-92a Standard Test Method for Bursting Strength of Paper except that the samples are soaked in a 3% by weight Ivory dish soap solution for 10 minutes prior to testing. The average of 5 wire and five felt samples is determined and recorded in pounds per square inch (psi).

Dry Burst Strength Test Method

The city burst strength is measured according to ASTM D 774-92a Standard Test Method for Bursting Strength of Paper. The average of 5 wire and five felt samples is determined and recorded in psi.

Wicking Test Method

A treated test substrate is prepared. A one inch×10 inch strip is cut from the resulting treated substrate, placed in one inch of distilled water, and allowed to sit for ten minutes. After ten minutes the distance the water traveled from the surface of the water is measured in inches and recorded. If the distance traveled is less than 0.06 inch, the treated substrate is recorded as being free of wicking.

% by Weight Dry Add On Calculation

The percent by weight dry add on is calculated using the formula:

$$\% \text{ by weight dry add on} = [(T_w - U_w)/U_w] \times 100,$$

where Tw is the weight of the treated (i.e., dried and cured) substrate and Uw is the weight of the untreated substrate.

% Retention Calculation

The percentage of retention is calculated according to the following formula:

$$\% \text{ Retention} = (\text{Wet Burst Strength}/\text{Dry Burst Strength}) \times 100.$$

Control 1

The composition of Control 1 was prepared by combining an emulsion polymer, paratoluene sulfonic acid, and methanol, with mixing, in the amounts set forth in Table 1.

Controls 2 and 3

The compositions of Controls 2 and 3 were prepared by combining an emulsion polymer, paratoluene sulfonic acid, and distilled water, with mixing, in the amounts set forth in Table 1.

Example 1

The composition of Example 1 was prepared by combining a 98:2 polyacrylic acid hydroxy ethyl acrylate copolymer, an emulsion polymer, epoxy resin, paratoluene sulfonic acid, and distilled water, with mixing, in the amounts set forth in Table 1.

Examples 2-4

The compositions of Examples 2-4 were prepared by combining a 98:2 polyacrylic acid hydroxy ethyl acrylate copolymer, an emulsion polymer, epoxy resin, methyltrioctyl ammonium chloride, and methanol, with mixing, in the amounts set forth in Table 1.

The compositions of Controls 1-3 and Examples 1-4 were applied to the test substrate, dried and cured for 5 minutes at 177° C., and then the resulting treated test substrates were tested according to the Wet Burst Strength and Dry Burst Strength test methods. The results are reported below in Table 1. The actual % by weight of the composition that was present on the treated substrate (i.e., the % by weight add on) is specified in Table 1 below.

TABLE 1

| Component | Control 1 | Control 2 | Control 3 | Example 1 | Example 2 | Example 3 | Example 4 |
|---|---|---|---|---|---|---|---|
| Acrylic Acid Copolymer[1] | 0 | 0 | 0 | 8.95 | 14.74 | 14.74 | 7.40 |
| PD8258[2] | 75 | 0 | 0 | 0 | 0 | 0 | 0 |
| PN3133M[3] | 0 | 0 | 87.6 | 73.75 | 0 | 0 | 0 |
| PD1062AF[4] | 0 | 81 | 0 | 0 | 57.24 | 57.24 | 56.40 |
| DER331[5] | 0 | 0 | 0 | 8.85 | 5.75 | 0 | 0 |
| XR6310B[6] | 0 | 0 | 0 | 0 | 0 | 5.75 | 11.00 |
| Paratoluene sulfonic acid[7] | 1.04 | 0.41 | 0.41 | 0.41 | 0 | 0 | 0 |
| ADOGEN 464[8] | 0 | 0 | 0 | 0 | 0.34 | 1.92 | 1.92 |
| Distilled Water | 0 | 410 | 396 | 393.04 | 0 | 0 | 0 |
| Methanol | 375 | 0 | 0 | 0 | 442.65 | 363.00 | 366.00 |

TABLE 1-continued

| Component | Control 1 | Control 2 | Control 3 | Example 1 | Example 2 | Example 3 | Example 4 |
|---|---|---|---|---|---|---|---|
| Wet Burst Test Test | | | | | | | |
| % Add On | 20.7 | 20.5 | 21.0 | 20.24 | 23.62 | 22.93 | 21.64 |
| Wet Burst Strength | 36.1 | 28.1 | 30.1 | 40.3 | 42.0 | 40.6 | 41.7 |
| Dry Burst Strength | 55 | 68 | 70 | 72 | 63 | 54 | 59 |
| % Retention | 66 | 41 | 43 | 56 | 67 | 75 | 71 |
| Wicking (inches) | 0 | 0 | 0 | 0 | 0 | 0 | 0 |

[1] PD8293A 98:2 acrylic acid hydroxyethyl acrylate copolymer having 57.8% solids, a pH of 3.1, and a viscosity of 2200 cP (H. B. Fuller Company)
[2] PD8258 polyvinyl acetate and 3% by weight, based on monomer weight, N-methylolacrylamide (which includes formaldehyde as an impurity) emulsion, stabilized with polyvinyl alcohol and having a Tg of 38° C., 58.00% solids, a pH of 5, and a viscosity of 1100 cP (H.B. Fuller Company).
[3] PN3133M polyvinyl acetate-silane copolymer emulsion stabilized with polyvinylalcohol having a Tg of 40° C., 54% solids, a pH of 4, and a viscosity of 1800 cP (H.B. Fuller Company).
[4] PD1062AF vinyl acetate homopolymer emulsion stabilized with hydroxyethylcellulose and nonionic surfactant, having a Tg of 39° C., 59.5% solids, a pH of 5, and a viscosity of 2000 cP (H.B. Fuller Company).
[5] DER 331 liquid epoxy resin derived from epichlorohydrin and bisphenol A (The Dow Chemical Company, Midland, Michigan).
[6] XR6310B 92.50% DER 331 liquid epoxy resin in 7.5% methanol.
[7] 65% solids paratoluene sulfonic acid (Pilot Chemical Co., Cincinnati, Ohio).
[8] ADOGEN 464 methyltri-(C8-C10)-alkyl ammonium chloride 85% solids dissolved in isopropyl alcohol (Evonik Goldschmidt Corp., Hopewell, Virginia).

The references referenced herein are incorporated herein to the extent they do not conflict with the statements herein.

What is claimed is:

1. A composition comprising:
    a water insoluble polymer having a Tg of at least about 25° C. and comprising polyvinyl acetate, vinyl acetate copolymer, styrene copolymer, acrylate copolymer, polyurethane, or a combination thereof;
    a polycarboxy functional polymer;
    a water insoluble epoxide functional compound; and organic solvent.

2. The composition of claim 1, comprising
    a first part comprising
        an emulsion comprising the water insoluble polymer, and
        the polycarboxy functional polymer; and
    a second part comprising the water insoluble epoxide functional compound.

3. The composition of claim 1 comprising an emulsion comprising the water insoluble polymer.

4. The composition of claim 3 comprising
    from about 35% by weight to about 95% by weight of the water insoluble polymer based on solids,
    from about 3% by weight to about 50% by weight of the polycarboxy functional polymer based on solids, and
    from about 1% by weight to about 50% by weight of the water insoluble epoxide functional compound based on solids.

5. The composition of claim 3 comprising
    from about 35% by weight to about 90% by weight of the water insoluble polymer based on solids,
    from about 5% by weight to about 70% by weight of the polycarboxy functional polymer based on solids, and
    from about 4% by weight to about 40% by weight of the water insoluble epoxide functional compound based on solids.

6. The composition of claim 3 wherein the water insoluble polymer further comprises functional groups.

7. The composition of claim 3 further comprising a catalyst.

8. The composition of claim 7, wherein the catalyst is present in the emulsion.

9. The composition of claim 7, Wherein the catalyst comprises a phase transfer catalyst.

10. The composition of claim 7, wherein the catalyst comprises a tetra-alkyl ammonium halide.

11. The composition of claim 7, wherein the catalyst comprises methyltrioctyl-ammonium chloride, tetra-n-butylammonium bromide, or a combination thereof.

12. The composition of claim 1 comprising
    from about 35% by weight to about 95% by weight of the water insoluble polymer based on solids,
    from about 3% by weight to about 50% by weight of the polycarboxy functional polymer based on solids, and
    from about 1% by weight to about 50% by weight of the water insoluble epoxide functional compound based on solids.

13. The composition of claim 1 comprising
    from about 35% by weight to about 90% by weight of the water insoluble polymer based on solids,
    from about 5% by weight to about 70% by weight of the polycarboxy functional polymer based on solids, and
    from about 4% by weight to about 40 weight of the water insoluble epoxide functional compound based on solids.

14. The composition of claim 1, wherein the water insoluble polymer further comprises functional groups.

15. The composition of claim 14, wherein the functional groups comprise epoxide, carboxyl, hydroxyl, amino, amido, siloxy, or a combination thereof.

16. The composition of claim 14, wherein the functional groups comprise carboxyl groups.

17. The composition of claim 1, wherein the water insoluble polymer comprises carboxy functional polyvinyl acetate copolymer.

18. The composition of claim 1, wherein the water insoluble polymer comprises polyvinyl acetate, polyvinyl acetate copolymer, or a combination thereof.

19. The composition of claim 1 wherein the water insoluble polymer, the polycarboxy functional polymer, and the water insoluble epoxide functional compound are soluble in the organic solvent.

20. The composition of claim 1, wherein the composition further comprises water.

21. The composition of claim 1, wherein the water insoluble polymer, the polycarboxy functional polymer, the water insoluble epoxide functional compound, or a combination thereof, is soluble in organic solvent.

22. The composition of claim 1, Wherein the polycarboxy functional polymer is water soluble.

23. The composition of claim 1, wherein the polycarboxy functional polymer is derived from acrylic acid, methacrylic acid, hydroxyethyl acrylate, hydroxymethyl acrylate, furmaric acid, maleic acid, maleic anhydride, itaconic acid, itaconic anhydride, isooctyl acrylic acid, isocrotonic acid, cinamic acid, 2-methyl maleic acid, 2-methyl itaconic acid, methyleneglutaric acid, or a combination thereof.

24. The composition of claim 1, wherein, when the composition is used to prepare a treated test substrate and the treated test substrate is tested according to the Wet Burst Strength test method, the treated substrate exhibits a wet burst strength of at least about 27 psi.

25. The composition of claim 1, wherein when the composition is used to prepare a treated test substrate and the treated test substrate is tested according to the Wet Burst Strength test method, the treated substrate exhibits a wet burst strength of at least about 30 psi.

26. The composition of claim 1, when the composition is used to prepare a treated test substrate and the treated test substrate is tested according to the Wet Burst Strength test method, the treated substrate exhibits a wet burst strength of at least about 38 psi.

27. The composition of claim 1, wherein when the composition is used to prepare a treated test substrate and the treated test substrate is tested according to the Wet Burst Strength test method, the treated substrate exhibits a wet burst strength of at least about 40 psi.

28. The composition of claim 1, wherein, when the composition is used to prepare a treated test substrate and the treated test substrate is tested according to the Wicking test method, the treated test substrate is free of wicking.

29. The composition of claim 1, wherein the organic solvent comprises acetone, methylethyl ketone, methanol, ethanol, isopropanol or a combination thereof.

30. A composition comprising:
a water insoluble polymer comprising polyvinyl acetate, vinyl acetate copolymer, styrene copolymer, acrylate copolymer, polyurethane, or a combination thereof the water insoluble polymer having a Tg of at least about 25 °C.;
a water soluble polycarboxy functional, polyhydroxy functional polymer derived from monomers comprising carboxy functional monomer and α, β-ethylenically unsaturated hydroxy functional monomer; and
a water insoluble epoxide functional compound.

31. The composition of claim 30 further comprising an organic solvent comprising a primary alcohol.

32. The composition of claim 30 comprising
from about 35% by weight to about 95% by weight of the water insoluble polymer based on solids,
from about 3% by weight to about 50% by weight of the polycarboxy, polyhydroxy functional polymer based on solids, and
from about 1% by weight to about 50% by weight of the water insoluble epoxide functional compound based on solids.

33. The composition of claim 30 comprising
from about 35% by weight to about 90% by weight of the water insoluble polymer based on solids,
from about 5% by weight to about 50% by weight of the polycarboxy, polyhydroxy functional polymer based on solids, and
from about 4% by weight to about 40% by weight of the water insoluble epoxide functional compound based on solids.

34. A composition comprising:
a water insoluble polymer comprising polyvinyl acetate, vinyl acetate copolymer, styrene copolymer, acrylate copolymer, polyurethane, or a combination thereof, wherein the water insoluble polymer has a Tq of at least about 25° C.;
a polycarboxy functional polymer;
a water insoluble epoxide functional compound; and
organic solvent comprising a primary alcohol.

* * * * *